(12) United States Patent
Pedersen

(10) Patent No.: US 10,623,808 B2
(45) Date of Patent: Apr. 14, 2020

(54) BROADHEAD HAVING BOTH DEPLOYABLE AND FIXED CUTTING BLADES

(71) Applicant: FeraDyne Outdoors, LLC, Superior, WI (US)

(72) Inventor: William E. Pedersen, Duluth, MN (US)

(73) Assignee: FeraDyne Outdoors, LLC, Superior, WI (US)

( * ) Notice: Subject to any disclaimer, the term of this patent is extended or adjusted under 35 U.S.C. 154(b) by 0 days.

(21) Appl. No.: 16/342,668

(22) PCT Filed: Oct. 13, 2017

(86) PCT No.: PCT/US2017/056548
§ 371 (c)(1),
(2) Date: Apr. 17, 2019

(87) PCT Pub. No.: WO2018/075356
PCT Pub. Date: Apr. 26, 2018

(65) Prior Publication Data
US 2019/0265008 A1 Aug. 29, 2019

Related U.S. Application Data

(60) Provisional application No. 62/408,933, filed on Oct. 17, 2016.

(51) Int. Cl.
*F42B 6/08* (2006.01)
*H04N 21/4363* (2011.01)
*F42B 6/04* (2006.01)
*F42B 12/34* (2006.01)
*H04N 21/441* (2011.01)
(Continued)

(52) U.S. Cl.
CPC ......... *H04N 21/43637* (2013.01); *F42B 6/04* (2013.01); *F42B 6/08* (2013.01); *F42B 12/34* (2013.01); *H04N 21/4104* (2013.01); *H04N 21/4126* (2013.01); *H04N 21/4131* (2013.01); *H04N 21/441* (2013.01); *H04N 21/8106* (2013.01); *H04W 12/06* (2013.01);
(Continued)

(58) Field of Classification Search
CPC ........................................................ F42B 6/08
See application file for complete search history.

(56) References Cited

U.S. PATENT DOCUMENTS 5,090,709 A * 2/1992 Johnson ............ F42B 6/08
473/584
5,458,341 A * 10/1995 Forrest ............ F42B 6/08
473/583
(Continued)

FOREIGN PATENT DOCUMENTS

WO WO2004037350 A2 5/2004

OTHER PUBLICATIONS

International Search Report for corresponding International Patent Application No. PCT/US2017/056548 dated Jan. 15, 2018.

*Primary Examiner* — John A Ricci
(74) *Attorney, Agent, or Firm* — Greenberg Traurig, LLP; Dipak Shah

(57) ABSTRACT

A non-limiting exemplary embodiment of a broadhead includes a ferrule having a multi-faceted tip, a plurality of cutting blades fixedly attached to the ferrule, and a plurality of deployable blades coupled to the ferrule.

27 Claims, 7 Drawing Sheets

(51) Int. Cl.
*H04N 21/41* (2011.01)
*H04N 21/81* (2011.01)
*H04W 12/06* (2009.01)

(52) U.S. Cl.
CPC ....... *A63B 2225/20* (2013.01); *A63B 2225/50* (2013.01); *A63B 2225/54* (2013.01)

(56) References Cited

U.S. PATENT DOCUMENTS

| | | | |
|---|---|---|---|
| 6,322,464 B1 * | 11/2001 | Sestak | F42B 6/08 473/583 |
| 6,935,976 B1 * | 8/2005 | Grace, Jr. | F42B 6/08 473/583 |
| 7,377,869 B2 * | 5/2008 | Wohlfeil | F42B 6/08 473/583 |
| 8,062,155 B2 * | 11/2011 | Butcher | F42B 6/08 473/578 |
| 8,197,367 B2 | 6/2012 | Pulkrabek et al. | |
| 8,758,176 B2 | 6/2014 | Pedersen | |
| 8,974,327 B2 * | 3/2015 | Priore | F42B 6/08 473/583 |
| 8,986,141 B2 | 3/2015 | Pedersen | |
| 9,017,191 B2 * | 4/2015 | Treto | F42B 6/08 473/583 |
| 9,028,349 B2 * | 5/2015 | Budris | F42B 6/08 473/583 |
| 9,404,722 B2 | 8/2016 | Pedersen | |
| 10,082,373 B2 * | 9/2018 | Romero | F42B 6/08 |
| 2003/0073525 A1 * | 4/2003 | Liechty, II | F42B 6/08 473/583 |
| 2006/0084535 A1 * | 4/2006 | Kuhn | F42B 6/08 473/583 |
| 2007/0161438 A1 | 7/2007 | Fulton | |
| 2010/0069182 A1 | 3/2010 | Baker | |
| 2012/0220400 A1 | 8/2012 | Pulkrabek et al. | |
| 2014/0031152 A1 | 1/2014 | Budris et al. | |

* cited by examiner

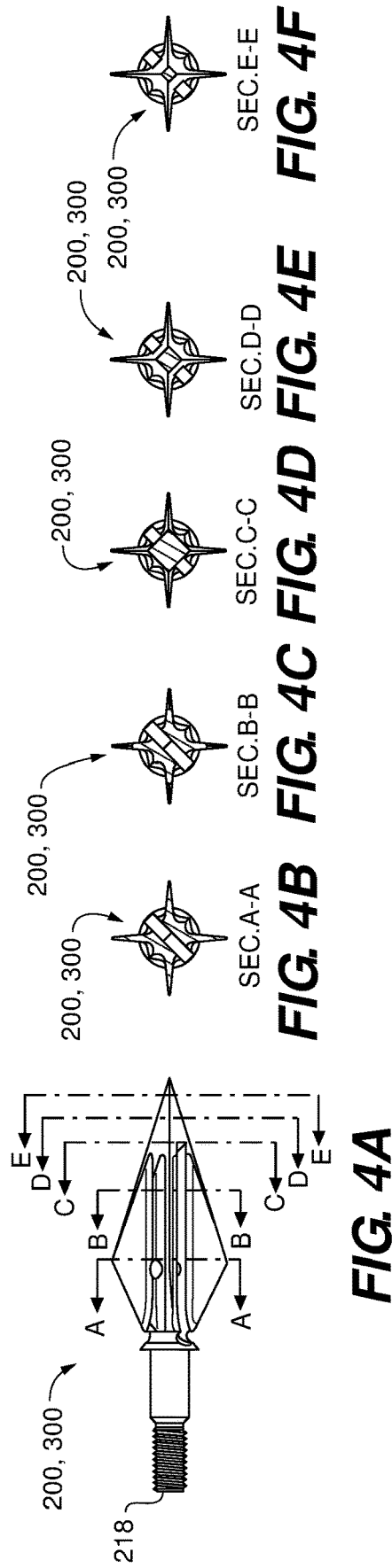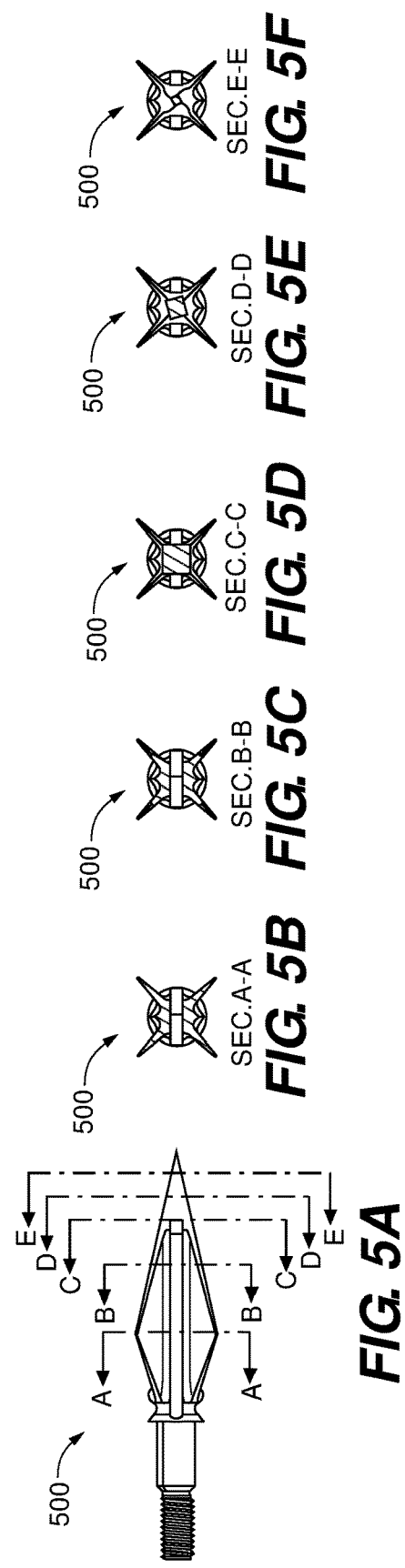

BROADHEAD HAVING BOTH DEPLOYABLE AND FIXED CUTTING BLADES

CROSS-REFERENCE TO RELATED APPLICATIONS

This application is a U.S. National Phase Patent Application of International Patent Application No. PCT/US2017/056548, filed Oct. 13, 2017, which claims the benefit of U.S. Provisional Patent Application No. 62/408,933 filed Oct. 17, 2016, the entirety of which are herein incorporated by reference.

STATEMENT REGARDING FEDERALLY SPONSORED RESEARCH OR DEVELOPMENT

Not applicable.

TECHNICAL FIELD

The instant disclosure relates to broadheads for attachment to arrow shafts.

BACKGROUND

A wide range of arrowhead designs suitable for archery are commercially available. One category of arrowheads is the broadhead—a bladed arrowhead featuring multiple sharp cutting blades that are designed to greatly increase the effective cutting area of the arrowhead when it impacts a target. Broadheads are popular in the bowhunting industry, as the increased cutting radius of a broadhead results in larger entrance and exit wounds in a game animal struck by the broadhead, causing increased blood loss which kills the animal quickly and humanely, and provides a better blood trail for tracking and retrieval of the carcass.

While broadheads provide an improved cutting capability when compared to non-bladed field point or nib point arrowheads, some broadhead designs suffer from inferior aerodynamic properties in comparison with their non-bladed counterparts. The blades of the broadhead, if deployed during the flight of an arrow, can result in undesirable effects and cause the arrow to veer off course from the flight path.

Prior art broadhead designs have attempted to resolve the aerodynamic issues by retaining, at least in part, the deployable cutting blades of the broadhead within the ferrule body of the broadhead during flight. Upon impacting the target, the blades are deployed, moving outwardly from the ferrule body and exposing the sharp cutting edges of the blades once fully deployed. Such designs are known by those skilled in the art as an "expandable broadhead." Some prior art expandable broadheads are disclosed in U.S. Pat. Nos. 8,197,367 and 8,986,141, which are hereby incorporated by reference.

FIG. 1 illustrates one such prior art expandable broadhead 100 having two deployable blades 105a and 105b. A retaining device 120 is provided for retaining the deployable blades 105a and 105b in a retracted configuration within a ferrule body 110. The expandable broadhead 100 includes a two-sided "cut-on-contact" tip 115, which is a sharpened double-edged piece of steel inserted within the ferrule body 110, and is designed to penetrate the hide of a target game animal while requiring a relatively small amount of energy for penetration.

Some expandable broadheads 100 are composed of metals such as stainless steel or aluminum alloys. However, manufacturing a broadhead out of titanium would offer several benefits. The weight of an expandable broadhead is at a premium, and lower weight materials enable broadhead designers to provide additional strength and cutting ability to the broadhead. Titanium has a high strength to weight ratio. While titanium's strength is similar to that of steel, it's density is approximately 60% less than the density of steel that is typically used in broadheads. For example, the density of titanium is approximately 0.160 pounds per cubic inch, while steel has a density of about 0.284 pounds per cubic inch. And, Grade 5 titanium has a yield strength of approximately 140,000 pounds per square inch when solution treated and aged, compared to the approximately 130,000 to 160,000 pounds per square inch yield strength of steel alloys commonly used in broadheads.

The relatively low weight and high strength of titanium makes it an attractive option for use in broadheads. However, known techniques for manufacturing titanium broadheads have disadvantages. For example, known processes manufacture titanium broadheads from titanium bar stock, which is expensive relative to the cost of steel and aluminum. And, titanium's high strength, abrasiveness, and low heat transfer coefficient cause the machining tools to overheat and wear out quickly. As such, manufacturing broadheads from the titanium bar stock are expensive and time consuming.

Moreover, in some designs, using titanium bar stock results in up to 90% waste, further increasing manufacturing costs. For example, approximately 0.033884 pounds (237 grains) of titanium bar stock would be required to machine one broadhead 100 of approximately 0.008424 pounds (59 grains). This results in a material scrap or waste of over 75%.

SUMMARY

A non-limiting exemplary embodiment of a broadhead includes a ferrule, a plurality of cutting blades fixedly attached to the ferrule, and a plurality of deployable blades. In some embodiments, the ferrule includes a multi-faceted tip and at least one blade recess. In certain embodiments, at least a portion of each of the plurality of deployable blades resides in at least a portion of the at least one blade recess. In some embodiments, each of the plurality of deployable blades include a leading edge and a sharp cutting edge.

In a non-limiting exemplary embodiment, the multi-faceted tip includes cutting edges between the facets. In some embodiments, the number of cutting edges and/or the number of cutting blades are a multiple of the number of deployable blades. In certain embodiments, the cutting edges and/or the cutting blades are offset from the deployable blades. In some embodiments, the cutting edges and the cutting blades are offset from each other and are further offset from the deployable blades.

In a non-limiting exemplary embodiment, the broadhead is configured for relieving fluid pressure. In some embodiments, the ferrule includes at least one cutting channel. In certain embodiments, the at least one cutting channel and at least one facet of the multi-faceted tip are contiguous. In some embodiments, the at least one blade recess and at least one facet of the multi-faceted tip are contiguous.

BRIEF DESCRIPTION OF THE DRAWINGS

FIG. 3B illustrates the broadhead of FIG. 3A in a dis-assembled state;

FIG. 4A is a side view of a non-limiting exemplary embodiment of a ferrule having a multi-faceted tip for the broadheads of FIGS. 2A-2E and 3A-3C;

FIG. 4B is a cross-sectional view along line A-A of the ferrule of FIG. 4A;

FIG. 4C is a cross-sectional view along line B-B of the ferrule of FIG. 4A;

FIG. 4D is a cross-sectional view along line C-C of the ferrule of FIG. 4A;

FIG. 4E is a cross-sectional view along line D-D of the ferrule of FIG. 4A;

FIG. 4F is a cross-sectional view along line E-E of the ferrule of FIG. 4A;

FIG. 5A is a side view of another non-limiting exemplary embodiment of a ferrule having a helical multi-faceted tip for the broadheads of FIGS. 2A-2E and 3A-3C;

FIG. 5B is a cross-sectional view along line A-A of the ferrule of FIG. 5A;

FIG. 5C is a cross-sectional view along line B-B of the ferrule of FIG. 5A;

FIG. 5D is a cross-sectional view along line C-C of the ferrule of FIG. 5A;

FIG. 5E is a cross-sectional view along line D-D of the ferrule of FIG. 5A; and

FIG. 5F is a cross-sectional view along line E-E of the ferrule of FIG. 5A.

DETAILED DESCRIPTION

One or more non-limiting embodiments are described herein with reference to the accompanying drawings, wherein like numerals designated like elements. It should be clearly understood that there is no intent, implied or otherwise, to limit the disclosure to the illustrated and described embodiments. While multiple exemplary embodiments are described, variations thereof will become apparent or obvious. Accordingly, any and all variants having structures and functionalities similar to those of the illustrated and described embodiments are considered as being within the metes and bounds of the instant disclosure.

Figure 2A:
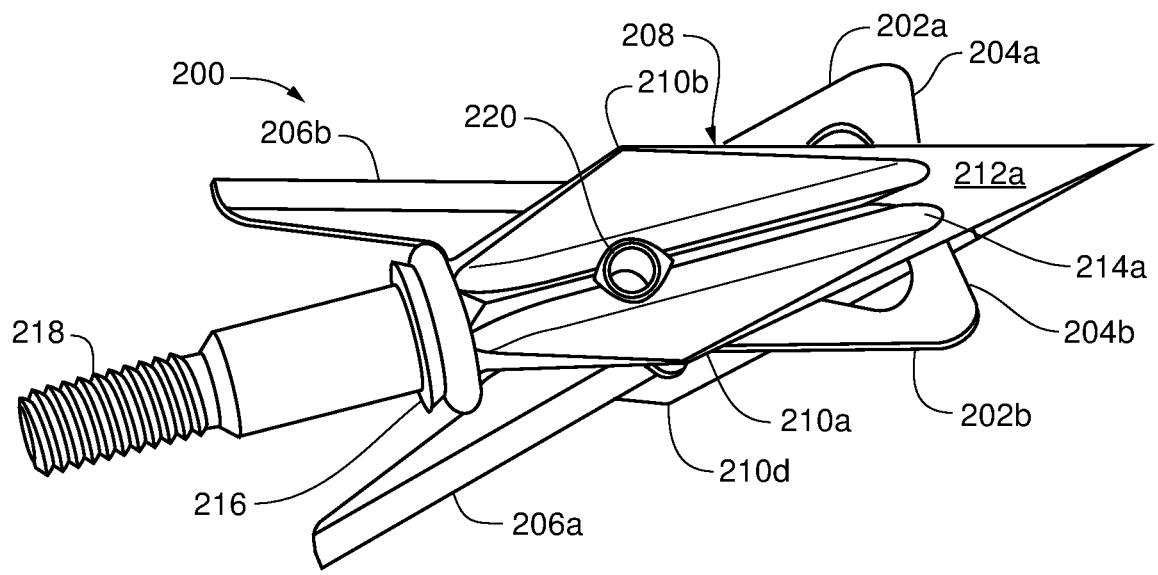
FIG. 2A is a perspective view of a non-limiting exemplary embodiment of a broadhead having a multi-faceted tip, cutting blades, and deployable blades in a retracted configuration.
Figure 2B:
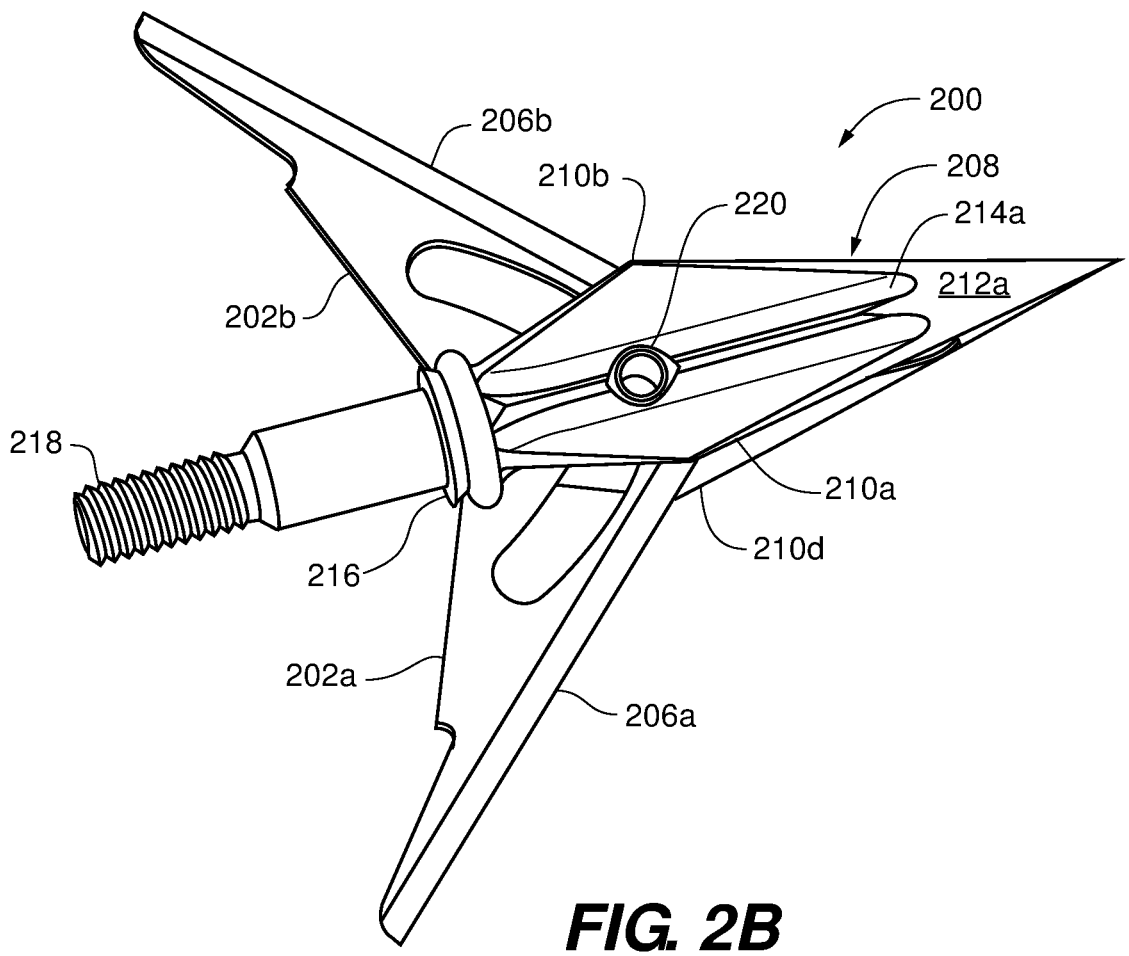
FIG. 2B is a perspective view of the broadhead of FIG. 2A with the deployable blades in a deployed configuration.
Figure 2C:
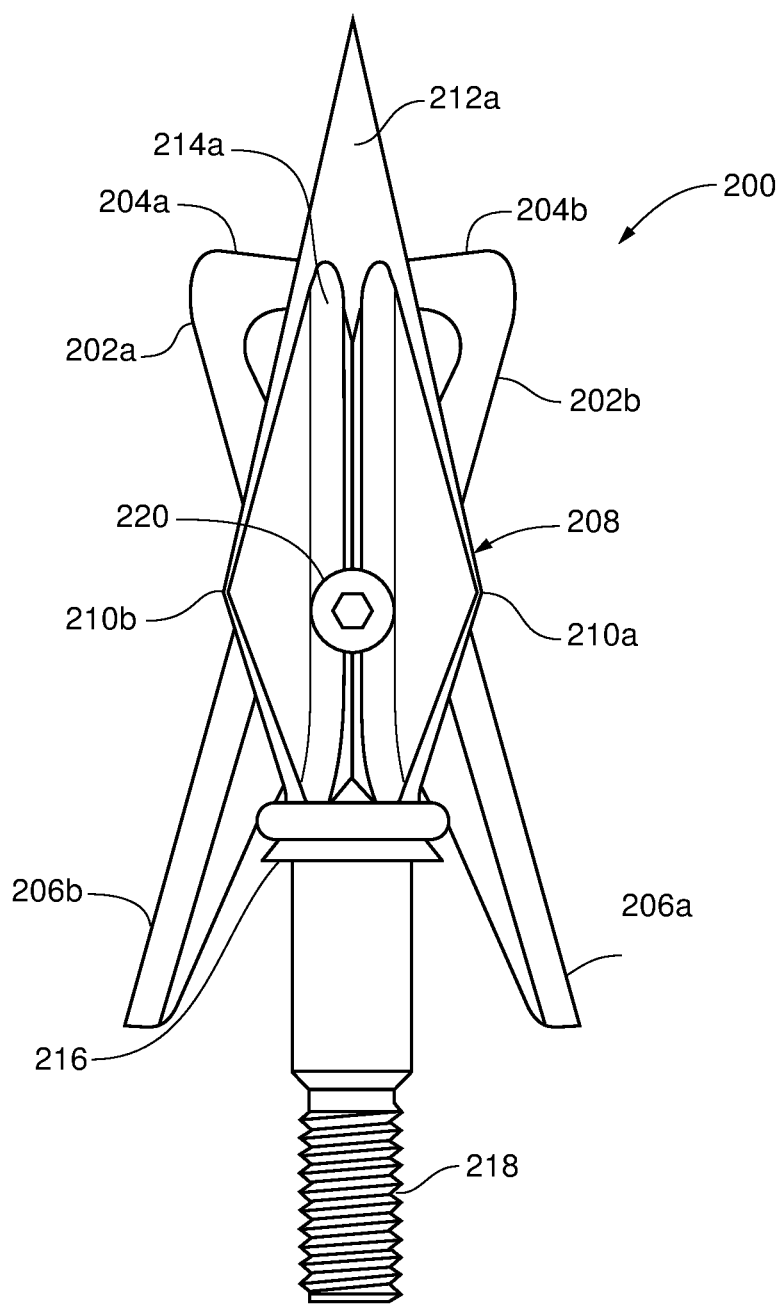
FIG. 2C is a side view of the broadhead of FIG. 2A.
Figure 2D:
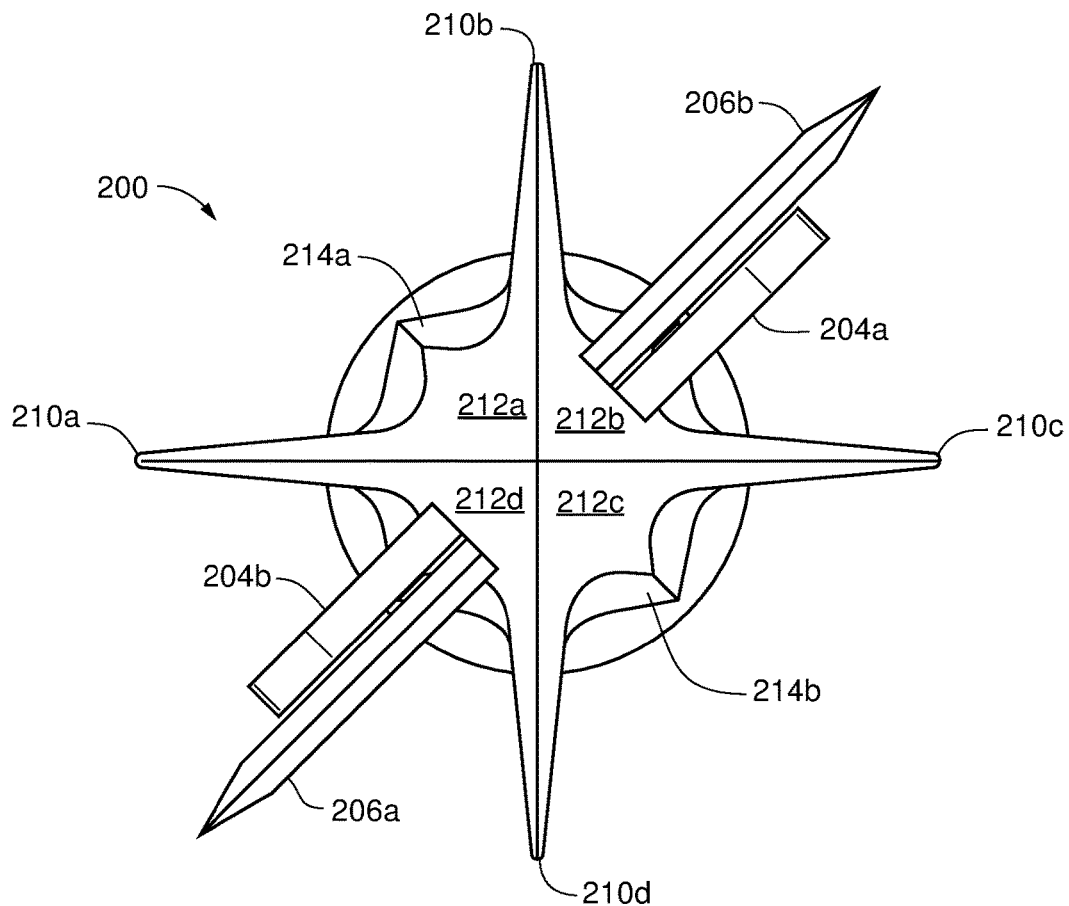
FIG. 2D is a front view of the broadhead of FIG. 2A.
Figure 2E:
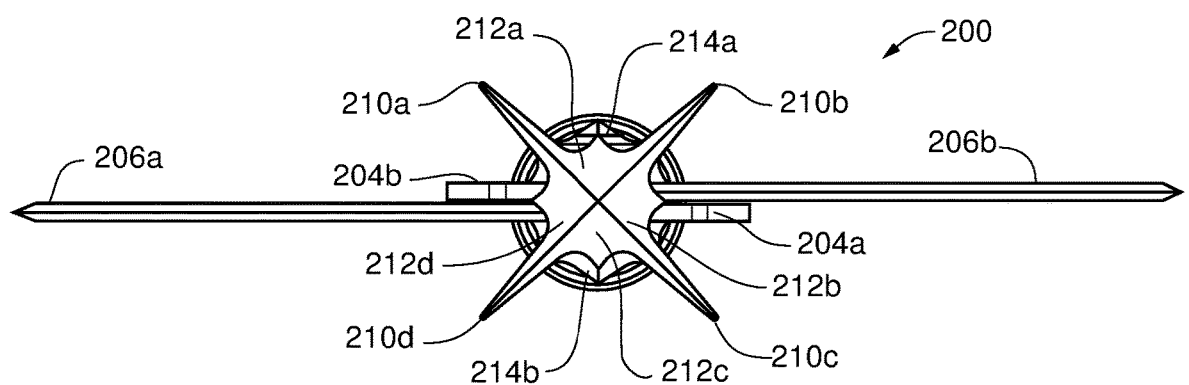
FIG. 2E is a front view of the broadhead of FIG. 2B.

FIGS. 2A-2E illustrate a non-limiting exemplary embodiment of a broadhead 200. FIG. 2A is a perspective view of the broadhead 200 with deployable blades 202a and 202b in a retracted configuration; FIG. 2B is a perspective view of the broadhead 200 with the deployable blades 202a and 202b in a deployed configuration; FIG. 2C is a side view of the broadhead 200 of FIG. 2A; FIG. 2D is a front view of the broadhead 200 of FIG. 2A; and FIG. 2E is a front view of the broadhead 200 of FIG. 2B.

Figure 3A:
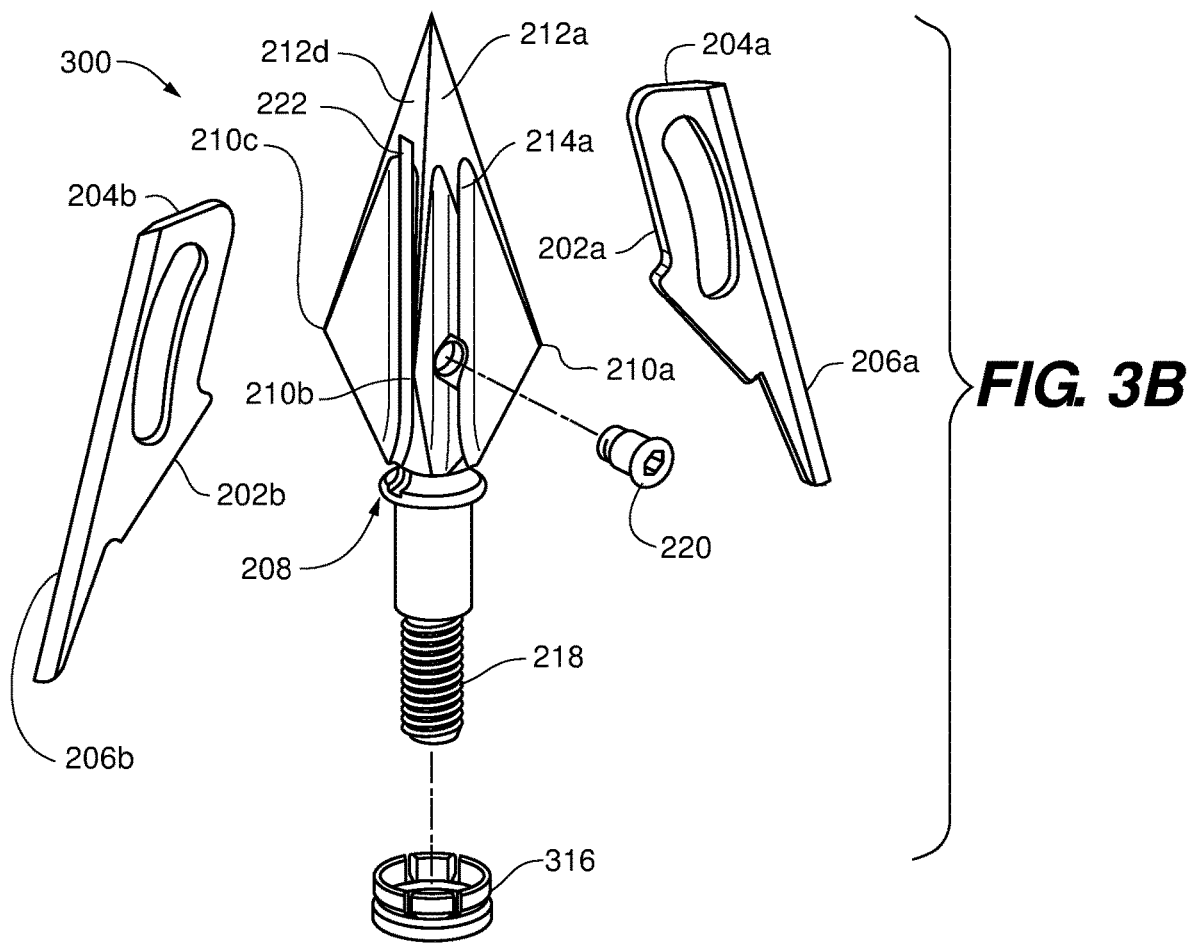
FIG. 3A is a perspective view of another non-limiting exemplary embodiment of a broadhead having a multi-faceted tip, cutting blades, and deployable blades in a retracted configuration.
Figure 3A:
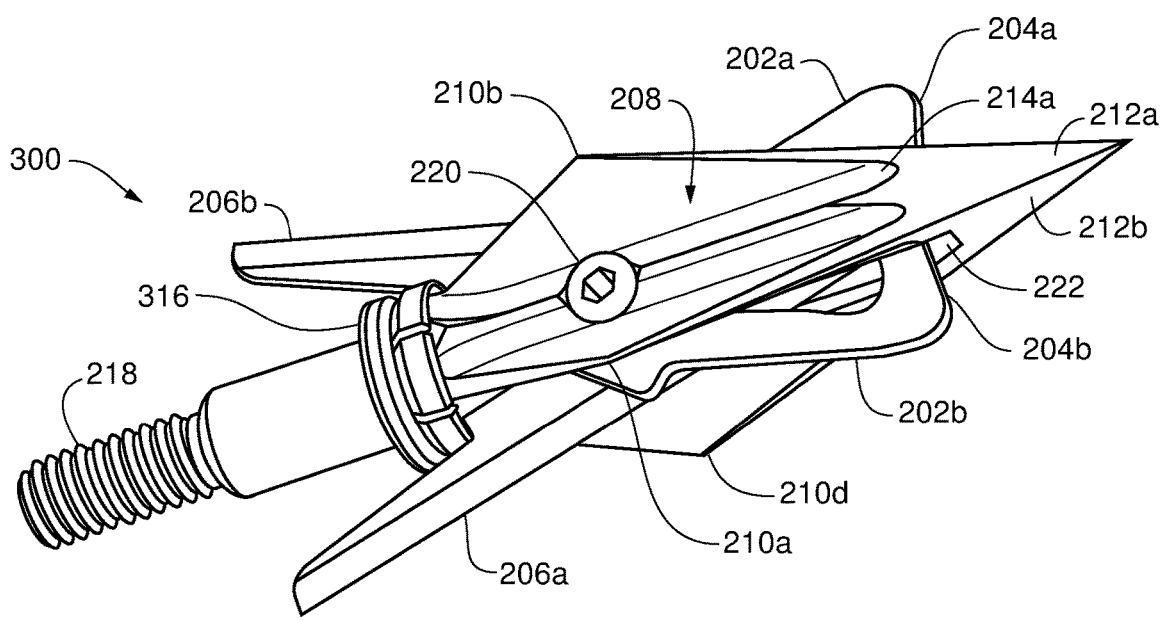
Figure 3C:
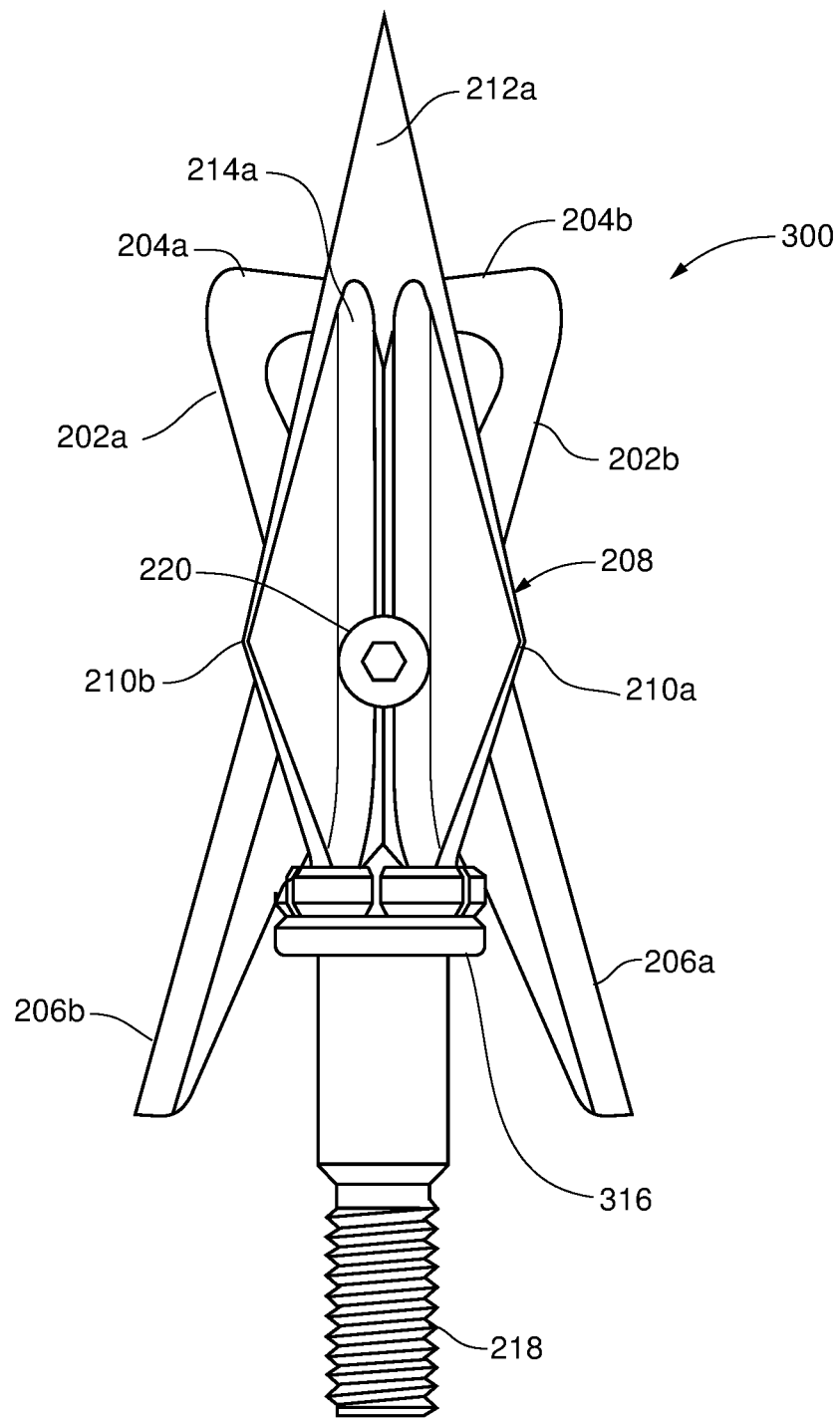
FIG. 3C is a side view of the broadhead of FIG. 3A.

FIGS. 3A-3C illustrate a non-limiting exemplary embodiment of a broadhead 300. FIG. 3A is a perspective view of the broadhead 300 with deployable blades 202a and 202b in a retracted configuration; FIG. 3B illustrates the broadhead 300 of FIG. 3A in a dis-assembled state; and FIG. 3C is a side view of the broadhead 300 of FIG. 3A.

It will be appreciated that broadheads 200 and 300 are substantially similar to each other in several aspects. As such, like elements of broadheads 200 and 300 are designated with like reference numerals. The at least one difference between the broadheads 200 and 300, as will be described herein below, is the retaining device used for retaining the deployable blades 202a and 202b in a retracted configuration during flight.

In a non-limiting exemplary embodiment, each broadhead 200 and 300 includes a ferrule 208 having a threaded portion 218 for attaching the broadhead to an arrow or bolt shaft (not shown). In a non-limiting exemplary embodiment, each broadhead 200 and 300 includes a multi-faceted chisel tip having four facets 212a-212d, four fixed or integral cutting blades 210a-210d, and two deployable blades 202a and 202b. It should be clearly understood that such configurations of broadheads 200 and 300 are merely exemplary and should not be implicitly or otherwise considered limiting. Alternate embodiments of broadheads 200 and/or 300 may have different quantities of fixed and/or deployable blades. Additionally, or in the alternative, the tip of the broadhead may have a configuration that is different from that illustrated and described.

In a non-limiting exemplary embodiment, the deployable blades 202a and 202b are attached to the ferrule body 208 of the broadheads 200 and 300 with a fastening mechanism 220. In some embodiments, the fastening mechanism 220 may be a roll pin, which can be removed to permit replacement of blades 202a and 202b. In certain embodiments, the fastening mechanism 220 may be a threaded fastener which can be removed to permit replacement of cutting blades 202a and 202b.

In some embodiments, the ferrule 208 includes at least one blade recess 222 for housing at least a portion of the deployable blades 202a and 202b. In certain embodiments, the blade recess may be a slot. In some embodiments, the ferrule 208 may have a varying number of blade recesses for housing at least a portion of one or more deployable blades.

In some non-limiting exemplary embodiments, the broadheads 200 and 300, respectively, include a retaining device 216 and 316 for retaining the deployable blades 202a and 202b in a retracted configuration during flight. In some embodiments, the retaining devices 216 and/or 316 are configured as a shock-absorbing device. In the non-limiting exemplary embodiment of broadhead 200, the retaining device 216 is an O-ring. In contrast, in the non-limiting exemplary embodiment of broadhead 300, the retaining device 316 is a shock collar. In some embodiments, the retaining device, e.g., the shock collar 316, includes lower and upper annular portions. In certain embodiments, the upper annular portion includes a plurality of slots which form leaves or sections between adjacent slots in the upper annular portion. It should be well understood that there is no intent, implied or otherwise, to limit the embodiments of the retaining devices 216 and 316 to an O-ring and/or a shock collar. Various non-limiting exemplary embodiments of retaining devices are disclosed in U.S. Pat. Nos. 8,758,176, and 8,986,141 which are herein incorporated by reference in their entirety. For facilitating deployment of the blades 202a and 202b, a retaining device, e.g., retaining device 216 and/or 316 may be constructed from a soft metal or a low surface friction material such as, for example, nylon, high-density polyethylene (HDPE) or polytetrafluoroethylene (PTFE).

In a non-limiting exemplary embodiment, deployable blades 202a and 202b, respectively, include a leading edge 204a and 204b, and a sharp cutting edge 206a and 206b. In certain embodiments, the leading edges 204a and 204b are blunt edges. In some embodiments, when the leading edges 204a and 204b impact a target, the deployable blades 202a and 202b move proximally along a longitudinal axis of the ferrule body 208, and the sharp cutting edges 206a and 206b move outward in a camming manner from ferrule body 208. It will be apparent to one skilled in the art that the camming of the deployable blades 202a and 202b is facilitated by the fastening mechanism 220. While the retaining devices 216 and 316 retain the deployable blades 202a and 202b in a retracted configuration during flight, and prior to impact, when the broadhead impacts a target, at least a portion of the retaining devices breaks apart as a result of the movement of the deployable blades 202a and 202b.

In a non-limiting exemplary embodiment, the broadhead may include at least one cutting channel in the ferrule. In some embodiments, the at least one cutting channel is configured for releasing fluid pressure that may accumulate in front of the broadhead as it penetrates a target. Alternate embodiments of the broadhead may include different quantities of cutting channels. For instance, the broadheads 200 and 300 include two cutting channels 214a and 214b. Additionally, or in the alternative, one or more of the cutting channels may have different shapes, sizes, and designs. For instance, in some embodiments, one or more of the cutting channels may be curved. In certain embodiments, one or more of the cutting channels may be serpentine. In some embodiments, one or more of the cutting channels may be contiguous with at least one of the facets 212a-212d of the multi-faceted tip.

In a non-limiting exemplary embodiment, the at least one blade recess 222 may be configured as a cutting channel configured for releasing fluid pressure that may accumulate in front of the broadhead as it penetrates a target. In some embodiments, one or more of the at least one blade recess 222 may be contiguous with at least one of the facets 212a-212d of the multi-faceted tip. In certain embodiments, wherein the at least one recess 222 is configured as a cutting channel, the broadhead may be devoid of a separate cutting channel. In certain embodiments, the broadhead may include one or more separate blade recesses 222 and cutting channels.

Figure 1:
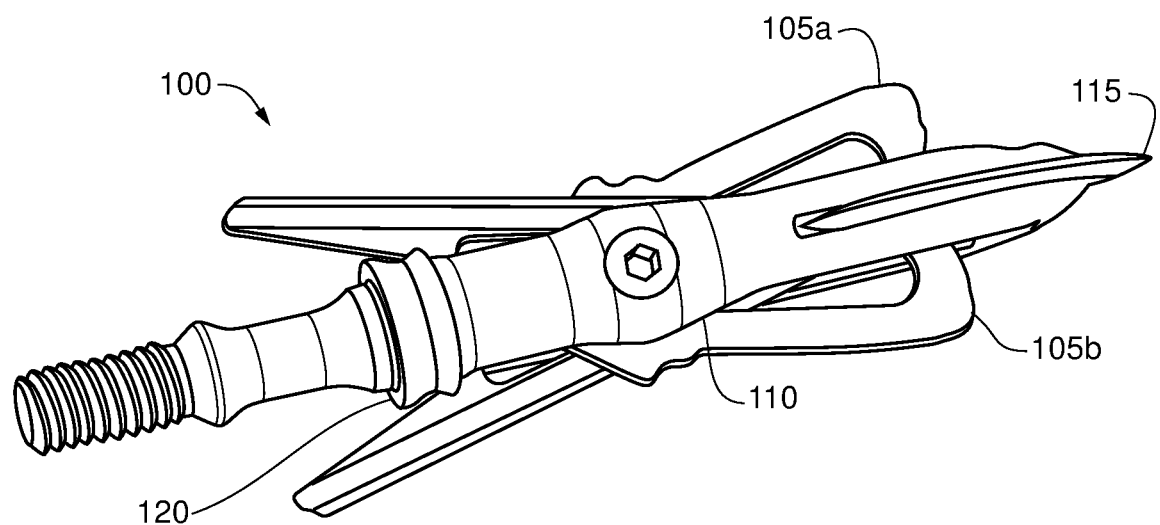
FIG. 1 is a perspective view of an embodiment of a prior art broadhead.

In a non-limiting exemplary embodiment, the broadheads 200 and 300 include a four-faceted chisel tip having facets 212a-212d and at least one cutting edge between adjacent facets of the tip. As will be appreciated by one skilled in the art, the cutting edges between the facets 212a-212d provide additional cutting surfaces. In contrast to the "scalpel" or "cut-on-contact" arrowhead tip 115 illustrated in FIG. 1, the four-faceted tip 212a-212d, in some embodiments, results in a broadhead having a center-of-mass located forward of center. In some embodiments, such offset of the center-of-mass improves the in-flight characteristics and aerodynamics of the broadhead. Additionally, or in the alternative, and in contrast to the tip 115, the four-faceted tip 212a-212d, in some embodiments, reduces the broadhead's susceptibility to impact damage caused by harder structures, e.g., bone, in a target. In a non-limiting exemplary embodiment, the four-faceted tip 212a-212d may be coated with a material selected from the group consisting of nickel, zinc, cadmium, and black oxide. Additionally, or in the alternative, the four-faceted tip 212a-212d, in some embodiments, may be coated with a friction reducing coating such as a PTFE-impregnated ceramic or fluoropolymer or other ceramic coating.

FIGS. 4A-4F illustrate a non-limiting exemplary embodiment of a four-faceted chisel tip having flat planar facets surfaces 212a-212d with straight-line cutting edges between adjacent facets. FIGS. 5A-5F illustrate another non-limiting exemplary embodiment of a broadhead 500 having a multi-faceted chisel tip with a helical pattern. In some embodiments, the helical patterned multi-faceted chisel tip of the broadhead 500 has spiraling cutting edges between adjacent facets. In certain embodiments, the helical pattern of the multi-faceted chisel tip is configured to direct air flow around the body of the broadhead 500. In some embodiments, the helical pattern of the multi-faceted chisel tip is configured for increasing the rotation of the broadhead 500 during flight. In certain embodiments, the helical pattern of the multi-faceted chisel tip is configured for reducing the impact of cross-winds on the broadhead 500 during flight. As will be apparent to one skilled in the art, such helical patterns, individually or in any combination, may be configured to improve the flight characteristics, and possibly the accuracy and precision, of the broadhead 500.

In a non-limiting exemplary embodiments, the surface of one or more facets of the multi-faceted chisel tip may be curved or concave. In some embodiments, the concavity of the facet surfaces increases the acuteness of the angle of the cutting edges between the facets. In certain embodiments, the concavity of the facet surfaces enhances the sharpness of the cutting edges between the facets. In some embodiments, the concavity of the facet surfaces enhances the penetration of the broadhead.

In a non-limiting exemplary embodiment, the number of fixed or integral cutting blades and/or the number of cutting edges in the multi-faceted tip are a multiple of the number of deployable blades. While the exemplary broadheads 200, 300, and 500 disclosed herein are illustrated and described having two deployable blades 202a and 202b, four fixed or integral cutting blades 210a-210d, and four cutting edges between the facets 212a-212d of the multi-faced tip, such configurations should not be construed as limiting. In some embodiments, any one or more of the broadheads 200, 300, and 500 may include two deployable blades and six fixed or integral cutting blades and/or six cutting edges on the multi-faced tip. In certain embodiments, any one or more of the broadheads 200, 300, and 500 may include three deployable blades and three or six fixed or integral cutting blades and/or three or six cutting edges on the multi-faced tip. In some non-limiting exemplary embodiments, the number of cutting edges on the multi-faced tip may be a multiple of the number of deployable blades. In certain non-limiting exemplary embodiments, the number of fixed or integral cutting blades may be a multiple of the number of deployable blades. In some non-limiting exemplary embodiments, the number of cutting edges on the multi-faced tip may be a multiple of the number of fixed or integral cutting blades. In general, the number of any one or more of the cutting edges, the fixed or integral cutting blades, and the deployable blades may be a multiple of one or more of the others.

In a non-limiting exemplary embodiment having four fixed cutting blades and two deployable blades, the fixed cutting blades may trisect the separation angles between the two deployable blades such that the six cutting surfaces is evenly spaced around the broadhead. In some embodiments having three fixed cutting blades and three deployable blades, each fixed cutting blade may bisect a separation angle between adjacent deployable blades.

In some embodiments, the cutting edges and/or the fixed cutting blades and/or the deployable blades are offset from each other in order to maximize the cutting ability of the broadhead. In a non-limiting exemplary embodiment, any one or more of the cutting edges, the fixed or integral cutting blades, and the deployable blades may be offset from any one or more of the others. For instance, in some embodiments, the cutting edges may be offset from the fixed cutting blades and/or offset from the deployable blades. In certain embodiments, the fixed cutting blades may be offset from the cutting edges and/or the deployable blades. In some embodiments, only one of the cutting edges, the fixed cutting blades, and the deployable blades may be offset from the other two.

In a non-limiting exemplary embodiment, offsetting the deployable blades from one or both the cutting edges and the fixed cutting blades enhances the deployment of the deployable blades when the leading edges of the deployable blades strike or impact the target while the deployable blades are in their retracted configuration. In certain embodiments, such offsetting of the deployable blades ensures that they fully deploy to expose the sharp cutting edges.

Additional and/or alternate embodiments and further detailed descriptions pertaining to the structural and functional characteristics of the deployable blades 202a and 202b, the retaining devices 216 and 316, and the multi-faceted tip are disclosed in co-owned U.S. Pat. Nos. 8,197,367, 8,986,141 and 9,404,722 which are hereby incorporated by reference in their entirety.

In a non-limiting exemplary embodiment, the deployable blades 202a and 202b are cut from a sheet or blank of blade stock material. The blade stock material may include various different steels, including tool steels (e.g., M-2, S-7, and D-2), stainless steels (e.g., 301, 304, 410, 416, 420, 440A, 440B, 440C, 17-4 PH, 17-7 PH, 13C26, 19C27, G1N4), high speed steels, carbon steels, carbides, titanium alloys, tungsten alloys, tungsten carbides, as well as other metals or any other suitable material for fabricating the deployable blades 202a and 202b.

In a non-limiting exemplary embodiment, the ferrule body of the one or more broadheads 200, 300, and 500, and the fixed or integral cutting blades 210a-210d, and the multi-faceted tip are manufactured from titanium. In certain embodiments, the titanium includes Grade 5 titanium (also known as Ti6A14V, Ti-6A1-4V, or Ti 6-4). Grade 5 titanium is a titanium alloy having a chemical composition of 6% aluminum, 4% vanadium, and a maximum of 0.25% iron and 0.2% oxygen. Other titanium alloys, such as Ti-6246, Ti-Beta-C, and Ti-MP35N, may also be used to manufacture the disclosed broadheads.

In some embodiments, the titanium ferrule body is manufactured using metal injection molding (MIM) or other powder metallurgy techniques as are well known in the art. In certain embodiments, titanium metal powder and a binder (such as, for example, a plastic or a wax are blended to form a powdered metal composition. This includes fully mixing the titanium metal powder and the binder into a near-homogenous mixture, and pelletizing the near-homogeneous mixture. Next, the pelletized mixture is injected into a mold shaped for a particular configuration of the broadhead with fixed or integral cutting blades and multi-faceted tip. Following the injection of the mixture into the mold, the powdered metal mixture is compacted into a greenware (shaped, but not sintered) broadhead body having the precise geometric configuration of the final product. This broadhead body may be approximately 20% larger than the intended final product to account for shrinkage during subsequent processing, and may have only moderate, e.g., approximately 50%, densification in comparison with the intended end product.

Next, the greenware broadhead body is processed to eliminate the binder from the metal without melting the constituent titanium metal. In some embodiments, this processing step includes immersing the greenware broadhead body in a solvent to separate a portion of the binder from the titanium, then placing the greenware broadhead body in a thermal de-binding furnace to burn off any remaining traces of the binder. In some embodiments, the thermal de-binding furnace may also be used to perform a pre-sintering step. The resultant greenware broadhead body will still be in a moderate densification state.

Following removal of the binder, the greenware broadhead body is placed in a sintering furnace and sintered at an elevated temperature and pressure until the broadhead body is near-full density of at least 97%. During the sintering process, the overall size of the broadhead body shrinks approximately 20%. Once sintering is complete, the broadhead body will be in its final shape with the fixed or integral cutting blades and the multi-faceted tip, and does not require further machining.

In other embodiments, superplastic forming is used for manufacture the broadhead body instead of powder metallurgy. In these embodiments, a titanium blank of Grade 5 titanium is superheated to a temperature of between 1,073 Kelvin (K) and 1,223 K. In some embodiments, the titanium blank is superheated to a temperature of approximately 1,103 K. In other embodiments, the titanium blank is superheated to a temperature of approximately 1,123 K. In still other embodiments, the titanium blank is superheated to a temperature of approximately 1,173 K.

At these elevated temperatures, the superheated titanium is capable of high levels of deformation, e.g., over 1,000% and in certain embodiments exceeding 1,800%. The superheated titanium can then be forged in an inert environment using materials capable of withstanding the elevated temperatures, e.g., extreme performance tool steels, cast ceramics, 22-4-9 stainless steel, and 49C steel, to the near net shape of the intended end broadhead body. In some embodiments, the inert environment is a vacuum in which parameters such as temperature, mechanical pressure, time, and interface alignment are precisely controlled.

When titanium is exposed to the atmosphere at the elevated temperatures in a high-temperature forging environment, the titanium will quickly oxidize or form nitrides on its surface. Such surface chemistry changes can lead to embrittlement and reduced material performance. As a result, in some embodiments, to protect the titanium from surface contamination, the titanium can be protected with an inert environment blanket, such as a gas. In other embodiments, the titanium can be protected with a surface protective layer of aluminum or glass, in which the titanium is encapsulated prior to forging.

Following the superplastic forming of the titanium to the near net shape of the broadhead body, the near net shape titanium ferrule body is cooled. The broadhead body is then heat treated to reduce any residual stresses developed during fabrication and/or to increase the strength of the broadhead body. The heat treating may include treating the broadhead body at an elevated temperature for a controlled length of time, followed by air cooling or quenching the heat-treated broadhead body at a controlled rate in water or oil, and aging the broadhead body by reheating the it to an elevated temperature. Following the heat-treating process, the broadhead body can undergo any grinding/machining processes needed to prepare the final version of the titanium broadhead body with its desired profile. In some embodiments, surfaces of the titanium broadhead body that do not require further machining can be chemically milled using, for example hydrofluoric acid.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A broadhead, comprising:
    a ferrule, comprising:
        a multi-faceted tip;
        at least one blade recess; and
        at least one cutting channel;
    a plurality of fixed cutting blades attached to the ferrule; and
    a plurality of deployable blades residing at least in part in the at least one blade recess and coupled with the ferrule, each deployable blade comprising:
        a leading edge; and
        a sharp cutting edge.

2. The broadhead of claim 1, comprising a retaining device for releasably retaining the plurality of deployable blades in a retracted configuration until impact.

3. The broadhead of claim 1, wherein the multi-faceted tip comprises cutting edges between facets.

4. The broadhead of claim 3, wherein each cutting edge of the multi-faceted tip is either a straight line edge or a curved line edge.

5. The broadhead of claim 3, wherein the cutting edges of the multi-faceted tip are offset from the cutting blades and from the deployable blades.

6. The broadhead of claim 3, wherein the cutting edges of the multi-faceted tip are offset from either the cutting blades or the deployable blades.

7. The broadhead of claim 3, wherein the cutting edges of the multi-faceted tip, the cutting blades, and the deployable blades are offset from each other.

8. The broadhead of claim 3, wherein the number of cutting edges of the multi-faceted tip is a multiple of the number of deployable blades.

9. The broadhead of claim 3, wherein the number of cutting edges of the multi-faceted tip is a multiple of the number of cutting blades.

10. The broadhead of claim 3, wherein both the number of cutting blades and the number of cutting edges of the multi-faceted tip are multiples of the number of deployable blades.

11. The broadhead of claim 1, wherein the multi-faceted tip comprises a helical pattern having spiraling cutting edges between facets.

12. The broadhead of claim 1, wherein the multi-faceted tip comprises a plurality of facets wherein at least one of the plurality of facets comprises a curved surface.

13. The broadhead of claim 1, wherein the ferrule is configured for relieving fluid pressure.

14. The broadhead of claim 1, wherein at least one facet of the multi-faceted tip and the at least one cutting channel are contiguous.

15. The broadhead of claim 1, wherein at least one facet of the multi-faceted tip and the at least one blade recess are contiguous.

16. The broadhead of claim 1, wherein the at least one cutting channel is curved.

17. The broadhead of claim 1, wherein the at least one cutting channel is serpentine.

18. The broadhead of claim 1, wherein the at least one blade recess is configured as a cutting channel.

19. The broadhead of claim 1, wherein the number of cutting blades is a multiple of the number of deployable blades.

20. The broadhead of claim 1, wherein the cutting blades are offset from the deployable blades.

21. The broadhead of claim 1, comprising a center of mass distal of a center of the broadhead.

22. The broadhead of claim 1, configured for one or more of:
    increasing rotation of the broadhead;
    reducing drag; and
    reducing the effect of cross-wind.

23. The broadhead of claim 1, wherein the deployable blades are replaceable.

24. The broadhead of claim 1, wherein each of the plurality of deployable blades is configured for translating proximally along a longitudinal axis of the ferrule and for radial rotation of a rear portion of the deployable blade away from the ferrule.

25. A broadhead, comprising:
    a ferrule, comprising:
        a multi-faceted tip; and
        at least one blade recess;
        wherein at least one facet of the multi-faceted tip and the at least one blade recess are contiguous;
    a plurality of fixed cutting blades attached to the ferrule; and
    a plurality of deployable blades residing at least in part in the at least one blade recess and coupled with the ferrule, each deployable blade comprising:
        a leading edge; and
        a sharp cutting edge.

26. A broadhead, comprising:
    a ferrule, comprising:
        a multi-faceted tip; and
        at least one blade recess configured as a cutting channel;
    a plurality of fixed cutting blades attached to the ferrule; and
    a plurality of deployable blades residing at least in part in the at least one blade recess and coupled with the ferrule, each deployable blade comprising:
        a leading edge; and
        a sharp cutting edge.

27. A broadhead, comprising:
    a ferrule, comprising:
        a multi-faceted tip; and
        at least one blade recess;
    a plurality of fixed cutting blades attached to the ferrule;
    a plurality of deployable blades residing at least in part in the at least one blade recess and coupled with the ferrule, each deployable blade comprising:
        a leading edge; and
        a sharp cutting edge; and
    a center of mass distal of a center of the broadhead.

* * * * *